US012585279B2

(12) United States Patent
Lundkvist

(10) Patent No.: US 12,585,279 B2
(45) Date of Patent: Mar. 24, 2026

(54) NAVIGATING A ROBOTIC MOWER ALONG A GUIDE WIRE

(71) Applicant: Globe (Jiangsu) Co., Ltd., Changzhou (CN)

(72) Inventor: André Lundkvist, Habo (SE)

(73) Assignee: Globe (Jiangsu) Co., Ltd., Changzhou (CN)

( * ) Notice: Subject to any disclaimer, the term of this patent is extended or adjusted under 35 U.S.C. 154(b) by 364 days.

(21) Appl. No.: 17/964,055

(22) Filed: Oct. 12, 2022

(65) Prior Publication Data

US 2023/0030855 A1 Feb. 2, 2023

Related U.S. Application Data

(63) Continuation of application No. PCT/CN2020/085103, filed on Apr. 16, 2020.

(51) Int. Cl.
 G05D 1/00 (2024.01)
 A01D 34/00 (2006.01)
 A01D 101/00 (2006.01)

(52) U.S. Cl.
 CPC ......... G05D 1/0265 (2013.01); A01D 34/008 (2013.01); A01D 2101/00 (2013.01)

(58) Field of Classification Search
 CPC .. G05D 1/0265; G05D 1/0225; A01D 34/008; A01D 2101/00; Y02T 10/70; Y02T 10/7072
 USPC ................ 701/25, 22, 23, 50, 400, 408, 498
 See application file for complete search history.

(56) References Cited

U.S. PATENT DOCUMENTS

| | | | |
|---|---|---|---|
| 8,433,468 B2 * | 4/2013 | Johnson .............. | A01D 34/008 701/519 |
| 8,942,862 B2 * | 1/2015 | Markusson ......... | G05D 1/0225 701/2 |
| 2012/0029753 A1 * | 2/2012 | Johnson ............. | B60L 15/2036 701/23 |
| 2020/0042008 A1 * | 2/2020 | Strandberg .......... | G05D 1/0225 |

FOREIGN PATENT DOCUMENTS

| | | | | |
|---|---|---|---|---|
| CN | 107608341 A | * | 1/2018 | |
| EP | 2412221 A2 | * | 2/2012 | .......... A01D 34/006 |
| EP | 2413214 B1 | * | 9/2013 | .......... A01D 34/008 |
| EP | 2547191 B1 | * | 9/2018 | .......... A01D 34/008 |
| WO | WO-2015115949 A1 | * | 8/2015 | .......... A01D 34/008 |
| WO | WO-2018010650 A1 | * | 1/2018 | |
| WO | WO-2019151919 A1 | * | 8/2019 | .......... A01D 34/008 |
| WO | WO-2019183907 A1 | * | 10/2019 | .......... A01D 34/008 |

* cited by examiner

*Primary Examiner* — Tiffany P Young
*Assistant Examiner* — Leah N Miller

(57) ABSTRACT

A method navigates a robotic mower by means of a wire. The robotic mower comprises at least one sensor. The method comprises detecting, by means of the at least one sensor, at least one signal from the wire, controlling the robotic mower to align with the wire, controlling the robotic mower to turn by an angle with respect to a section of the wire, controlling the robotic mower to increase the distance between the robotic mower and the wire by driving a displacement distance based on a random distance value, measuring, by means of the at least one sensor, a signal level of the at least one signal from the wire, and controlling the robotic mower to follow the wire based on the measured signal level.

17 Claims, 10 Drawing Sheets

FIG 1
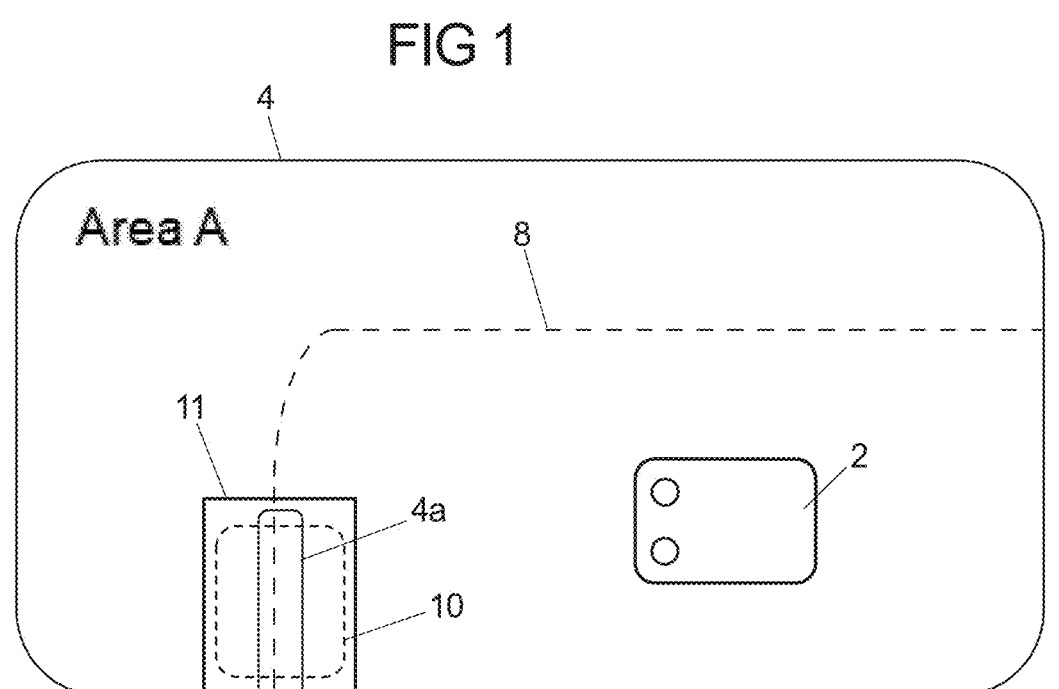
FIG 2
FIG 3
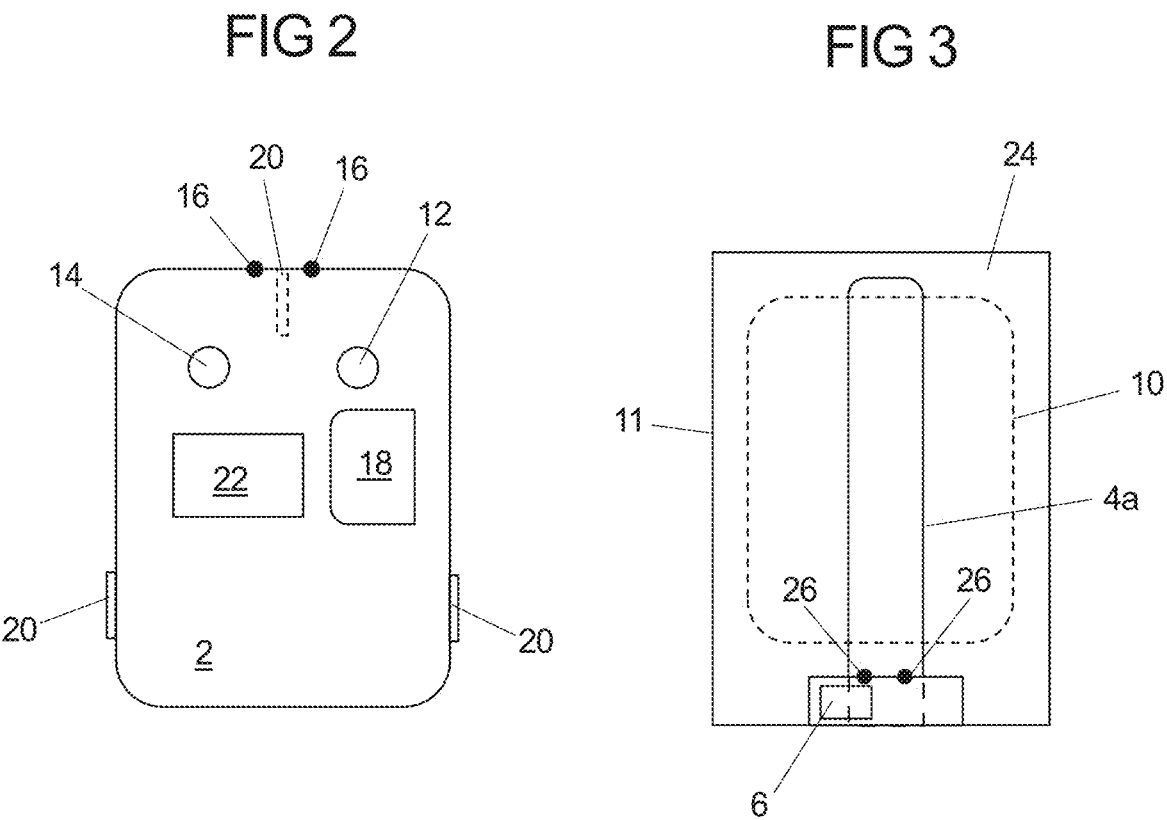

FIG 4
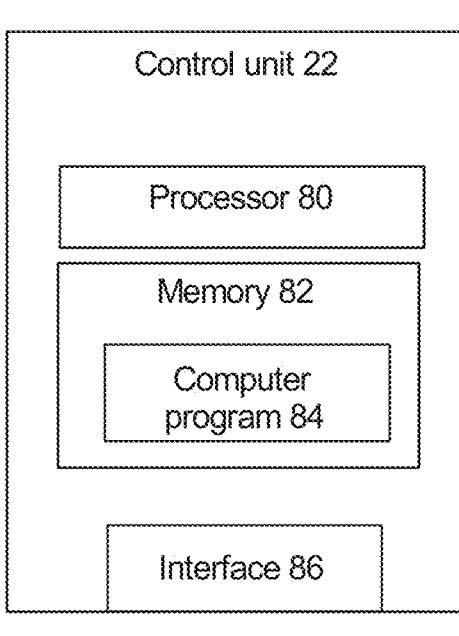
Control unit 22
Processor 80
Memory 82
Computer program 84
Interface 86
FIG 5
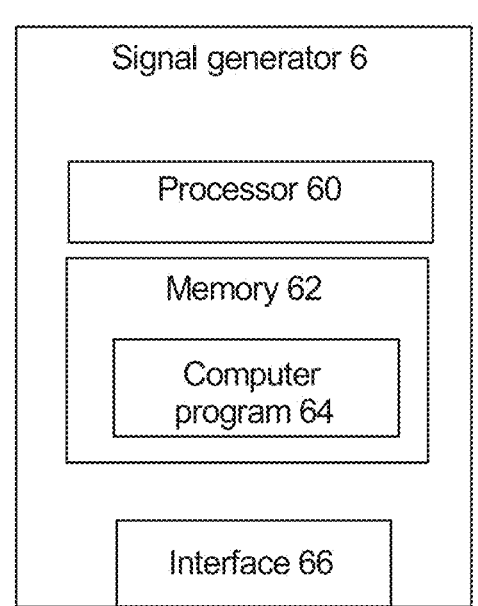
Signal generator 6
Processor 60
Memory 62
Computer program 64
Interface 66
FIG 6A
Area A

FIG 7

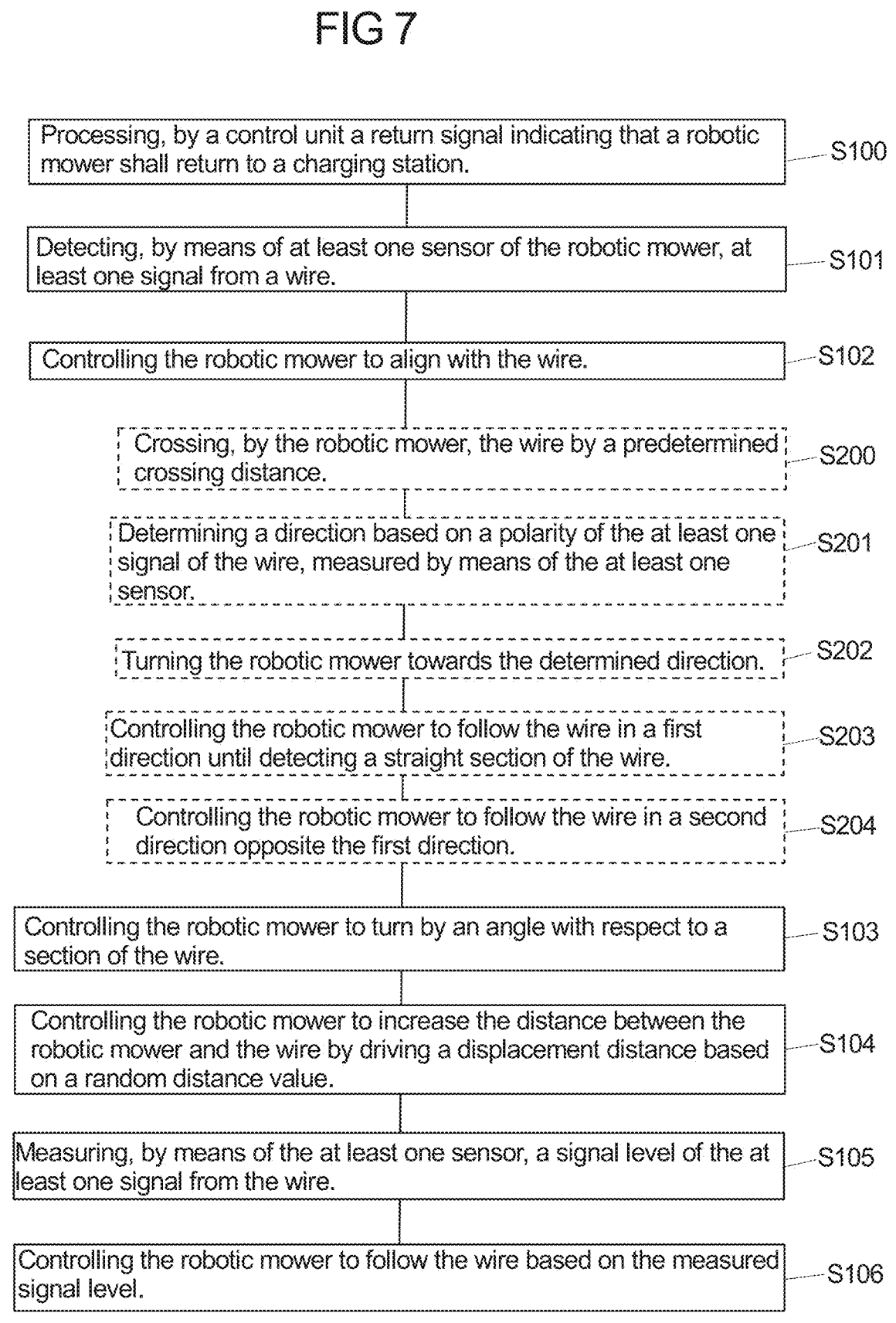

Processing, by a control unit a return signal indicating that a robotic mower shall return to a charging station. — S100

Detecting, by means of at least one sensor of the robotic mower, at least one signal from a wire. — S101

Controlling the robotic mower to align with the wire. — S102

Crossing, by the robotic mower, the wire by a predetermined crossing distance. — S200

Determining a direction based on a polarity of the at least one signal of the wire, measured by means of the at least one sensor. — S201

Turning the robotic mower towards the determined direction. — S202

Controlling the robotic mower to follow the wire in a first direction until detecting a straight section of the wire. — S203

Controlling the robotic mower to follow the wire in a second direction opposite the first direction. — S204

Controlling the robotic mower to turn by an angle with respect to a section of the wire. — S103

Controlling the robotic mower to increase the distance between the robotic mower and the wire by driving a displacement distance based on a random distance value. — S104

Measuring, by means of the at least one sensor, a signal level of the at least one signal from the wire. — S105

Controlling the robotic mower to follow the wire based on the measured signal level. — S106

FIG 8

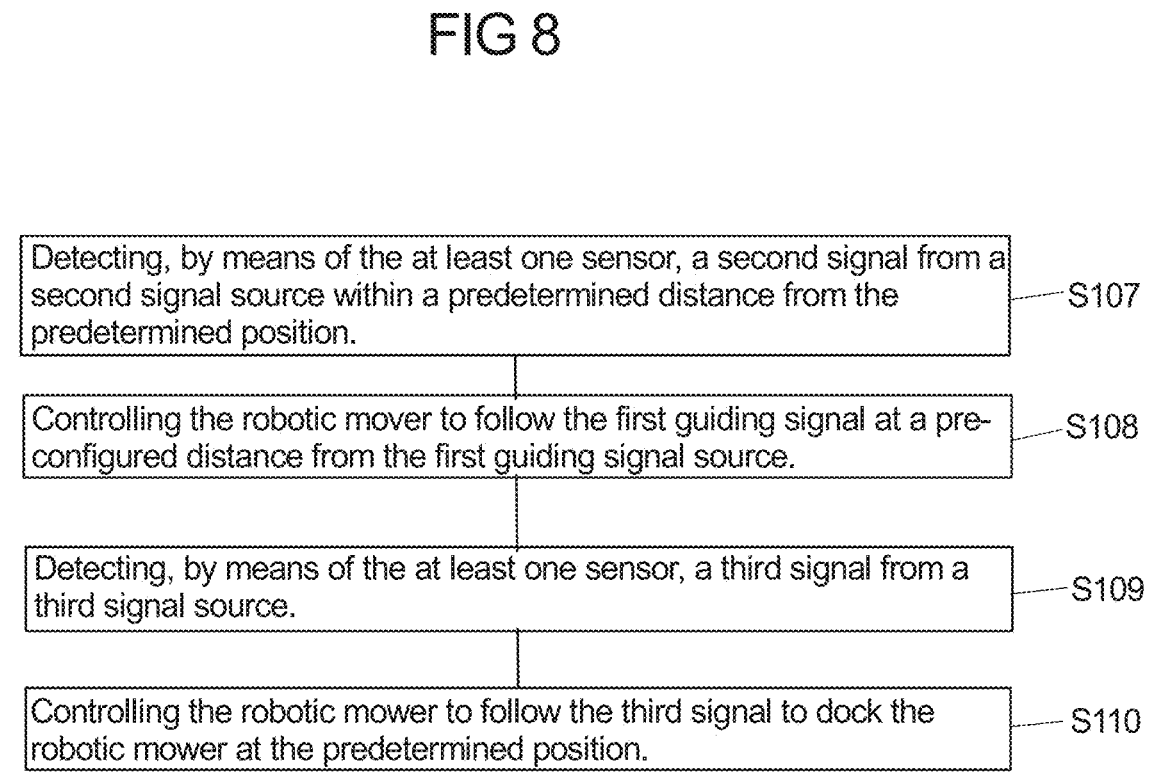

| Detecting, by means of the at least one sensor, a second signal from a second signal source within a predetermined distance from the predetermined position. | S107 |

| Controlling the robotic mover to follow the first guiding signal at a pre-configured distance from the first guiding signal source. | S108 |

| Detecting, by means of the at least one sensor, a third signal from a third signal source. | S109 |

| Controlling the robotic mower to follow the third signal to dock the robotic mower at the predetermined position. | S110 |

NAVIGATING A ROBOTIC MOWER ALONG A GUIDE WIRE

TECHNICAL FIELD

The present invention generally relates to a method for navigating a robotic mower along a signal wire, e.g., back to a charging station when a battery of the robotic mower needs to be recharged.

BACKGROUND ART

Robotic mowers, also called self-propelled lawnmowers, are generally known. These robotic mowers are provided with a rechargeable battery. When the remaining power in the battery is below a certain level the robotic mower is programmed to return to the charging station to recharge the battery. There are different possibilities for returning the robotic mower to the charging station. One possible method is that the robotic mower, upon a command to return to the charging station, continues its movement until a boundary wire is detected and then follows the boundary wire to the charging station that is provided somewhere along the boundary wire.

Another option when returning to the charging station is to use a guide wire, which the robotic mower follows back to the charging station. The use of a guide wire often enables a shorter and faster way back to the charging station compared to following the boundary wire. The guide wire can also be beneficial to use when the robotic mower needs to navigate through a narrow passage.

One problem when following the guide wire or boundary wire is that the robotic mower can create tracks in the lawn when driving the same path multiple times. WO 2019/183907 A1 successfully addresses this by detecting, by means of at least one sensor, a signal from the guide wire and following the guide wire at a distance, wherein the distance corresponds to a given signal strength that is sensed by the at least one sensor and wherein a control unit randomly selects the signal strength each time the guide wire signal is detected.

Other robotic mowers may apply ranges for signal values, and a random one of these ranges may be selected each time the robotic mower returns to the charging station. This can simplify the control of the robotic mower, but usually has the drawback of a reduction in the randomness of the actual paths of the robotic mower. Therefore, over time, tracks may still be formed at certain spots and/or in certain setups.

Additionally, the signal level usually depends on the length of the corresponding wire, and this may be different in different sites, such as smaller or larger gardens. Further, the signal level can be different depending on whether a user decides to route the wire on the surface of the ground or bury it under the surface. In practice, it can therefore be necessary for a user to adjust the settings of the robotic mower such no tracks are formed while the mower is still able to enter relatively narrow passages.

SUMMARY

An object of the present invention is to provide a method for navigating a robotic mower by means of a wire, and that reduces the risk of forming tracks in a simple and reliable manner.

According to an aspect of the present invention this object is achieved by a method for navigating a robotic mower by means of a wire, e.g., for returning the robotic mower to a charging station when the robotic mower needs to be recharged. Therein, the robotic mower comprises at least one sensor. The method comprises detecting, by means of the at least one sensor, at least one signal from the wire. The method further comprises controlling the robotic mower to align itself with the wire. Thereafter, the method provides controlling of the robotic mower to turn by an angle with respect to a section of the wire. Thereafter, the method comprises the step of controlling the robotic mower to increase the distance between the robotic mower and the wire by driving a distance that can be referred to as displacement distance based on a random distance value. Then, a signal level of the at least one signal from the wire is measured by means of the at least one sensor of the robotic mower. After that, the method provides controlling of the robotic mower such that the robotic mower follows the wire based on the measured signal level.

This is based on the idea to use odometry for adjusting a random distance to the wire, and only apply the signal level to maintain this distance. Therefore, environmental changes or differing signal levels in different use cases do no longer necessarily have a direct impact on the distance the robotic mower assumes. Further, no signal level ranges need to be applied, so that the randomness of the distance can be improved, further reducing the risk of tracks forming.

In an exemplary embodiment, controlling the robotic mower to drive the displacement distance based on the random distance value comprises counting a number of revolutions of a rotatable component of the robotic mower, e.g., of at least one wheel of the robotic mower and/or measuring a time. This allows a high precision in setting the distance.

In another exemplary embodiment, controlling the robotic mower to align with the wire comprises crossing, by the robotic mower, the wire by a predetermined distance that may be referred to as crossing distance, and, optionally, determining a direction based on a polarity of the at least one signal of the wire, measured by means of the at least one sensor, and, optionally, turning the robotic mower towards the determined direction. This allows a very quick and precise determination of the direction along which the robotic mower needs to be steered. For example, the determined direction may be that of the charging station.

According to an exemplary embodiment, the robotic mower comprises at least two sensors, and turning the robotic mower towards the determined direction comprises rotating the robotic mower with respect to the wire until the two sensors detect the at least one signal of the wire with opposite polarity. This allows to find the right direction in a simple, yet precise and quick manner.

In yet another exemplary embodiment, controlling the robotic mower to align with the wire comprises controlling the robotic mower to follow the wire in a first direction until detecting a straight section of the wire, and, optionally, in response to detecting a straight section of the wire, controlling the robotic mower to follow the wire in a second direction opposite the first direction. By this, the robotic mower positions itself in front of a straight-line section of the wire, so that it can precisely initially set its randomly selected distance to the wire in a predictable manner.

In another exemplary embodiment, controlling the robotic mower to follow the wire in the second direction comprises driving a distance that can be referred to as reversing distance based on the random distance value. In other words, the random distance value may be used twice, first for the reversing distance, and second, for the displacement distance.

Optionally, the random distance value is multiplied by a first factor for calculating the reversing distance, and the random distance value is multiplied by a second factor for calculating the displacement distance. The first and second factors can be the same, or different from one another.

In another exemplary embodiment, controlling the robotic mower to turn by the angle with respect to the section of the wire comprises turning the robotic mower with respect to the section of the wire by 30 to 60 degrees, in particular by 45 degrees.

According to yet another embodiment, the wire is a guide wire arranged within an area delimited by a boundary wire. The guide wire guides the robotic mower to a predetermined position, e.g. to the charging station and/or beyond a narrow passage.

In yet another exemplary embodiment, the method according is adapted for guiding the robotic mower to a predetermined position, wherein the at least one signal from the wire is a first guiding signal and the wire is a first guiding signal source. The method further comprises controlling the robotic mower to follow the first guiding signal at a fixed distance from the first guiding signal source, detecting, by means of the at least one sensor, a second signal from a second signal source within a predetermined distance from the predetermined position, controlling the robotic mower to follow the first guiding signal at a pre-configured distance from the first guiding signal source, and detecting, by means of the at least one sensor, a third signal from a third signal source and following the third signal to dock the robotic mower at the predetermined position.

The above object is also achieved by a method for guiding a robotic mower to a predetermined position, said robotic mower comprising at least one sensor, wherein the method comprises: detecting, by means of the at least one sensor, a first guiding signal from a first guiding signal source, controlling the robotic mower to follow the first guiding signal at a fixed distance from the first guiding signal source, detecting, by means of the at least one sensor, a second signal from a second signal source within a predetermined distance from the predetermined position, controlling the robotic mower to follow the first guiding signal at a pre-configured distance from the first guiding signal source, detecting, by means of the at least one sensor, a third signal from a third signal source, and following the third signal to dock the robotic mower at the predetermined position.

Optionally, the third signal source is a portion of a boundary wire, or electrically connected with a boundary wire, wherein the boundary wire delimits an area.

According to an embodiment, the first guiding signal source is a guide wire arranged within the area delimited by the boundary wire.

According to an embodiment, the third signal source is a loop of the boundary wire.

In another embodiment a charging station is provided at the predetermined position, and the boundary wire loop is arranged at a charging station plate of the charging station.

According to another embodiment the robotic mower is guided to the predetermined position more than once, wherein the fixed distance is varied each time, while the pre-configured distance is the same for each time.

Another object is to provide a robotic mower that is adapted to navigate by means of a wire, and that reduces the risk of forming tracks in the lawn in a simple and reliable manner.

According to another aspect this object is achieved by a robotic mower comprising at least one sensor, and adapted to: detect, by means of the at least one sensor, at least one signal from a wire, align with the wire, turn by an angle with respect to a section of the wire, increase the distance to the wire by driving a displacement distance based on a random distance value, measure, by means of the at least one sensor, a signal level of the at least one signal from the wire, and follow the wire based on the measured signal level.

In an exemplary embodiment, the robotic mower is further adapted to count a number of revolutions of a rotatable component of the robotic mower and/or to measure a time for driving the displacement distance based on the random distance value.

In an exemplary embodiment, the robotic mower is further adapted to cross the wire by a predetermined crossing distance, to determine a direction based on a polarity of the at least one signal of the wire measured by means of the at least one sensor, and to turn towards the determined direction.

In an exemplary embodiment, the robotic mower comprises at least two sensors, and is further adapted to turn towards the determined direction by rotating with respect to the wire until the two sensors detect the at least one signal of the wire with opposite polarity.

In an exemplary embodiment, the robotic mower is further adapted to follow the wire in a first direction until detecting a straight section of the wire, and, in response to detecting a straight section of the wire, to follow the wire in a second direction opposite the first direction.

In an exemplary embodiment, the robotic mower is further adapted to follow the wire in the second direction by driving a reversing distance based on the random distance value.

In an exemplary embodiment, the robotic mower is further adapted to multiply the random distance value by a first factor for calculating the reversing distance, and to multiply the random distance value by a second factor for calculating the displacement distance.

In an exemplary embodiment, the angle to turn with respect to the section of the wire is 30 to 60 degrees, in particular 45 degrees.

Optionally, the robotic mower is adapted to perform the method of any aspect or embodiment described herein.

According to another aspect the above object is achieved by a robotic mower comprising at least one sensor, and adapted to detect, by means of the at least one sensor, a first guiding signal from a first guiding signal source, follow the first guiding signal at a fixed distance from the first guiding signal source, detect, by means of the at least one sensor, a second signal from a second signal source within a predetermined distance from the predetermined position, follow the first guiding signal at a pre-configured distance from the first guiding signal source, detect, by means of the at least one sensor, a third signal from a third signal source, and follow the third signal to dock the robotic mower at the predetermined position, in particular with a charging station.

According to an embodiment, the robotic mower is further adapted to, when navigating to the predetermined position more than once, vary the fixed distance each time, while using the same pre-configured distance each time.

According to an aspect, a system comprising a wire and the robotic mower according to any aspect or embodiment described herein is provided. Therein, the wire may be a guide wire arranged within an area delimited by a boundary wire.

According to an aspect, a computer program comprising computer program code is provided, the computer program code being adapted, when executed by one or more processers of a robotic mower, to cause the robotic mower to perform the method according to any aspect or embodiment described herein.

According to an aspect, a computer-readable storage medium storing computer program code, the computer program code being adapted, when executed by one or more processers, to cause a robotic mower to perform the method according to any aspect or embodiment described herein.

By this, a method and robotic mower for navigating the robotic mower by means of a wire are provided, that reduce the risk of forming tracks in the lawn in a simple and reliable manner.

BRIEF DESCRIPTION OF DRAWINGS

The invention is now described, by way of example, with reference to the accompanying drawings, in which:

FIG. 1 a schematic view of a robotic mower system.

FIG. 2 is a schematic view of an exemplary embodiment of the robotic mower.

FIG. 3 is a schematic view of an exemplary embodiment of a charging station of the robotic mower system.

FIG. 4 is a schematic block diagram of a control unit in the robotic mower.

FIG. 5 is a schematic block diagram of a signal generator.

FIG. 7 is a flow chart of an exemplary method for navigating the robotic mower by means of the guide wire.

FIG. 8 is a flow chart of steps of an exemplary method for navigating the robotic mower.

DESCRIPTION OF EMBODIMENTS

Figure 6B:
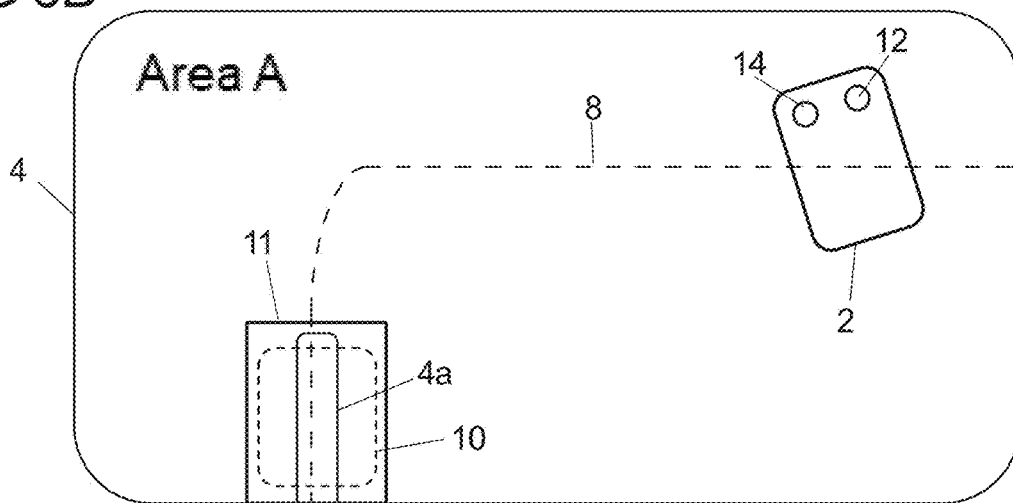
FIG. 6A to FIG. 6S show different steps when the robotic mower navigates along a guide wire of the robotic mower system.

In the following, a detailed description of exemplary embodiments for navigating a robotic mower by means of a wire according to the present disclosure will be presented.

FIG. 1 shows a schematic overview of a system for performing the method of embodiments for navigating a robotic mower 2 by means of a guide wire 8 towards a predetermined position, such as a charging station 11. The robotic mower 2, or as it also may be called a self-propelling lawnmower, is battery powered and needs to be recharged at regular intervals. The robotic mower 2 is during operation configured to move across an area A surrounded by a boundary wire 4. As is obvious the robotic mower 2 is depicted somewhat enlarged for the sake of clarity. The boundary wire 4 may be configured in many different ways, such that it delimits the area A within which the robotic mower 2 is allowed to move. The boundary wire 4 is preferably provided under the ground in the lawn, such that is not visible, but may also be provided on or above the ground. The boundary wire 4 could be an ordinary copper wire of single-core type. There are of course also other options, which are well-known by a person skilled in the art, such as multi stranded wire types. As may be seen in FIG. 1 the boundary wire 4 makes a loop 4a in the charging station 11. This loop 4a will be used to guide the robotic mower 2 into charging contact with the charging station 11, which will be described further below.

The system also comprises the charging station 11 mentioned above. The charging station itself 11 may be seen as the place where the charging of the robotic mower 2 takes place, and could for an example be provided with a charging plate onto which the robotic mower 2 is guided when performing docketing. A charging plate will make the docketing process more precise, since the robotic mower 2 will be at an even and predictable ground during the docketing process. In order to identify where the charging station 11 is located, there is provided a charging station loop 10 around the charging station 11. As shown in FIG. 1 the boundary wire loop 4a is narrower than and crosses the charging station loop 10.

A system according to the present disclosure may also as an option comprise one or more guide wires 8. A guide wire 8 is a wire that the robotic mower 2 may follow when returning to the charging station 11 and/or to move along a way that is otherwise difficult to find. The robotic mower may also be adapted to follow the boundary wire 4 back to the charging station 11, which depending on where the robotic mower 2 starts to follow the boundary wire 4 may be quite a distance. By using a guide wire 8 it is possible to return the robotic mower 2 to the charging station 11 in a faster and less energy consuming way.

The boundary wire 4, the charging station loop 10 and the one or more guide wires 8 are all connected to a signal generator which feeds each wire and loop with an Alternating Current, AC, signal, such that the robotic mower 2 may recognize which wire or loop it is detecting when it is within sensing distance. In general, the robotic mower 2 may be adapted to detect magnetic fields of the different signal wires.

Turning now to FIG. 2, an exemplary embodiment of the robotic mower 2 will be closer described. The robotic mower 2 comprises a control unit 22, wheels 20, at least one sensor 12, 14 and a battery 18. The control unit 22, which will be closer described in conjunction with FIG. 4, comprises among other things a processor 80 for controlling the movement of the robotic mower 2. When the robotic mower 2 is in operation the sensors 12, 14 can sense a magnetic field that is generated in the boundary wire 4, the charging station loop 10 and the one or several guide wires 8. The sensed magnetic field (signal) is decoded in the control unit 22 to determine from which loop or wire it was received. The robotic mower 2 further comprises charging connectors 16. In the present example, the robotic mower 2 comprises exactly two sensors 12, 14 but in alternative embodiments the robotic mower 2 may comprise more than two, e.g., three or four sensors.

It is worth noting that the robotic mower 2 has a forward-rearward axis along which the robotic mower 2 moves when it drives straight ahead or straight backwards. In the present example, the robotic mower 2 has a longitudinal extension in accordance with the forward-rearward axis. The two sensors 12, 14 are arranged displaced to one another in a direction orthogonal to the forward-rearward axis. In this example, the sensors 12, 14 are arranged in a front region of the robotic mower 2 and could be referred to as front sensors 12, 14.

FIG. 3 shows an exemplary embodiment of the charging station 11. The charging station 11 comprises a charging station plate 24 at which the charging station loop 10 (which can also be referred to as far-field loop) and the boundary wire loop 4a (which may also be referred to as near-field loop) are arranged. The charging station 11 further comprises the signal generator 6. As shown in FIG. 3, the charging station 11 comprises charging connectors 26 which are arranged so as to be contacted by the charging connectors 16 of the robotic mower 2 when docking into the charging station 11.

With reference to FIG. 4, the control unit 22 of the robotic mower 2 will be closer described. The control unit 22 comprises, as mentioned above, the processor 80 and a memory 82. The memory 82 may comprise a computer program 84 comprising computer program code, i.e. instructions. The computer program code is adapted to implement method steps performed by the robotic mower 2 when the code is executed on the processor 80. The control unit 22 further comprises an interface 86 for communication with the sensors 12, 14, and one or more motors that operate(s) the robotic mower 2.

The processor 80 may comprise a single Central Processing Unit (CPU), or could comprise two or more processing units. For example, the processor 80 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 80 may also comprise a storage for caching purposes.

FIG. 5 depicts the signal generator 6, which also comprises a processor 60 and a memory 62. The memory 62 may comprise a computer program 64 comprising computer program code, i.e. instructions. The computer program code is adapted to implement method steps performed by the signal generator 6 when the code is executed on the processor 60. The signal generator 6 further comprises an interface 66 for transmitting the generated AC signals to the boundary wire 4, charging station loop 10 and guide wire or wires 8.

As for processor 80 also the processor 60 may comprise a single Central Processing Unit (CPU), or could comprise two or more processing units. For example, the processor 60 may include general purpose microprocessors, instruction set processors and/or related chips sets and/or special purpose microprocessors such as Application Specific Integrated Circuits (ASICs), Field Programmable Gate Arrays (FPGAs) or Complex Programmable Logic Devices (CPLDs). The processor 60 may also comprise a storage for caching purposes.

Figure 6C:
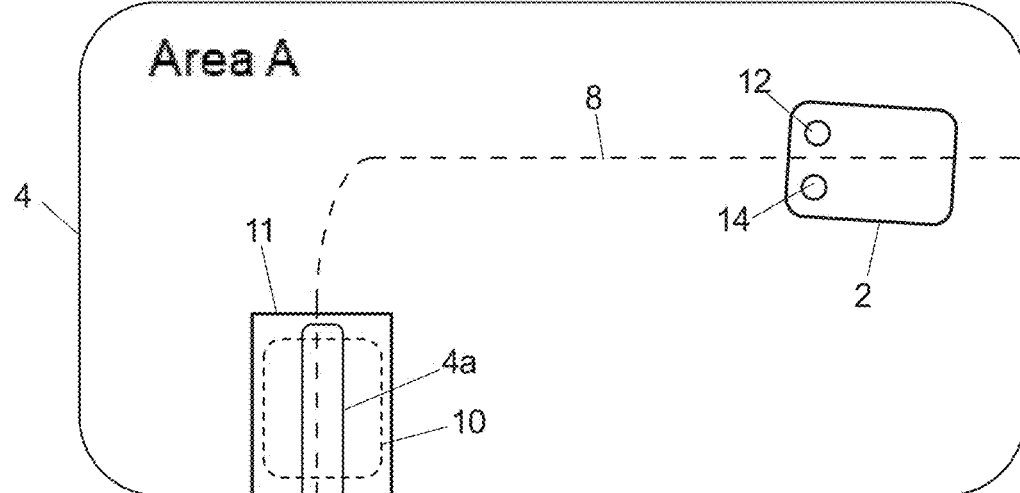
Figure 6D:
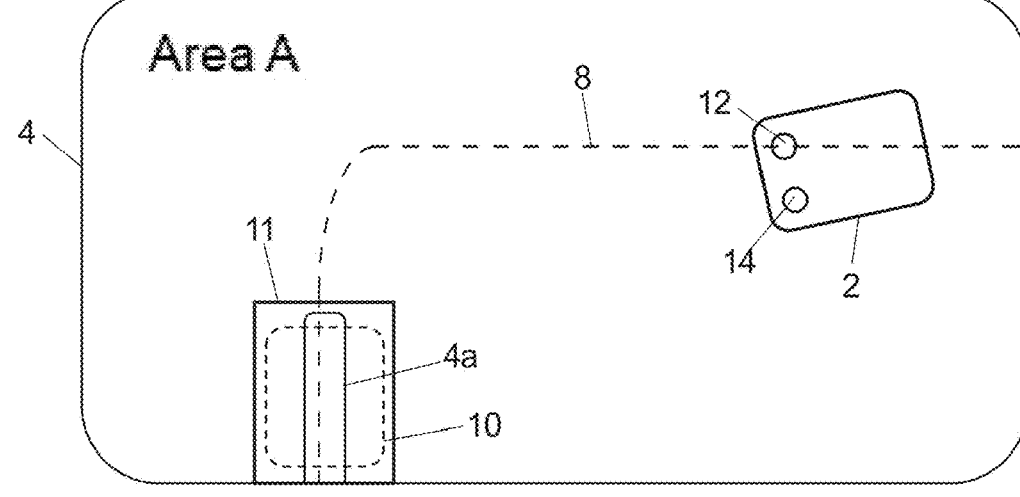
Figure 6E:
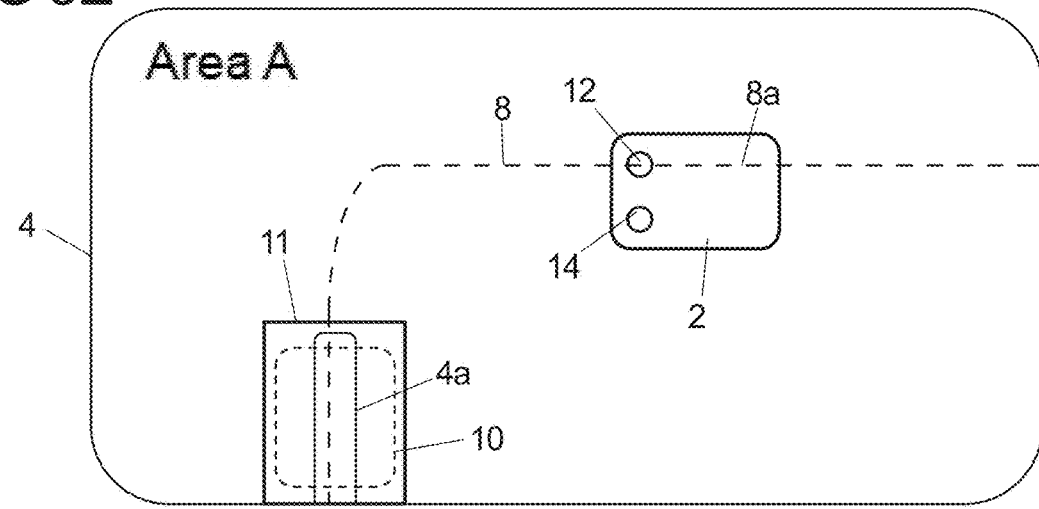
Figure 6F:
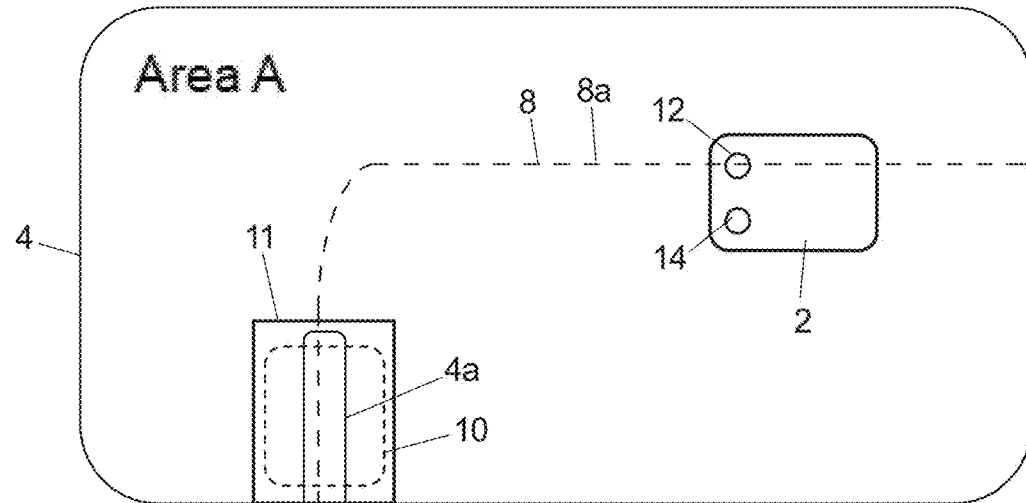
Figure 6G:
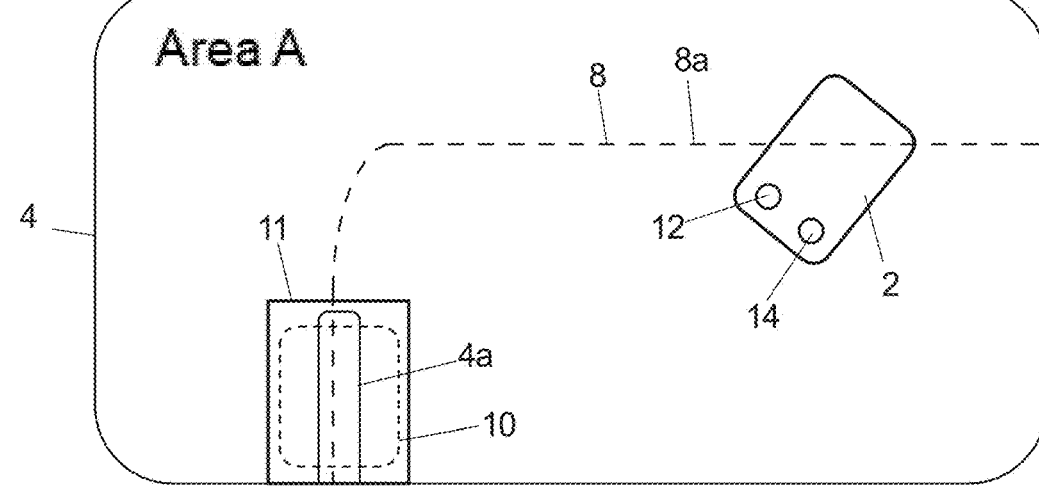
Figure 6H:
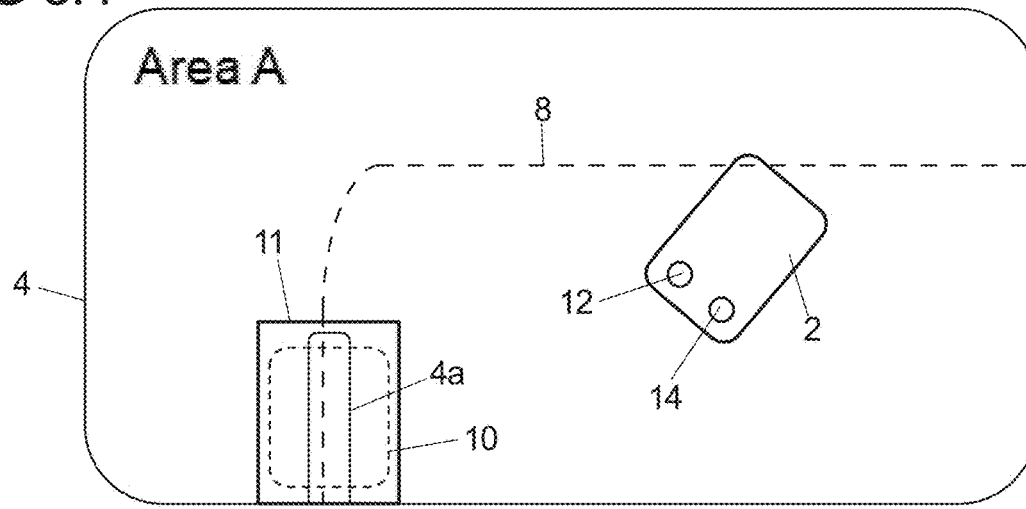
Figure 6I:
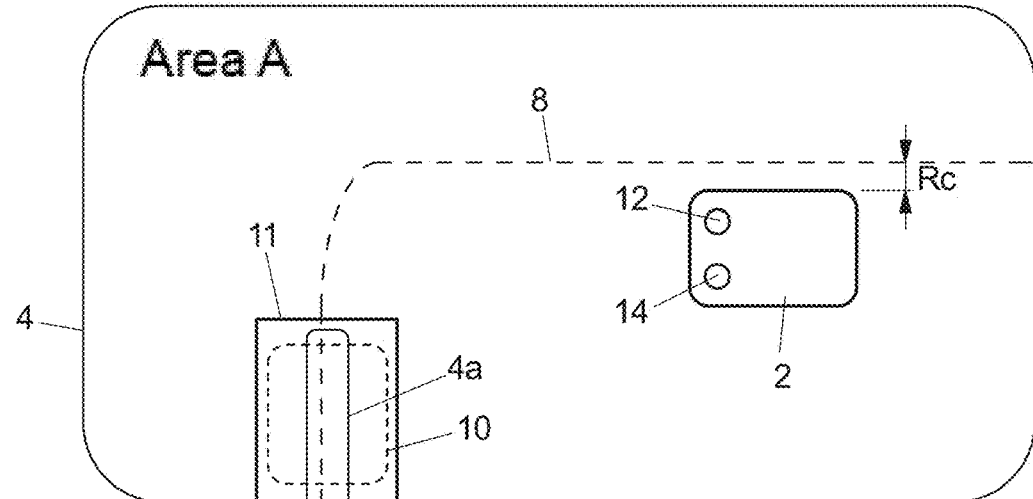
Figure 6J:
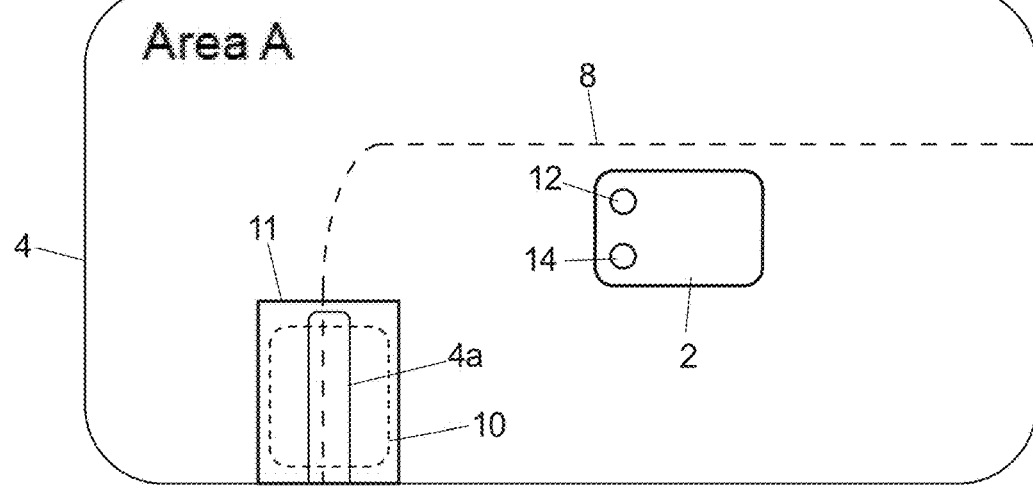
Figure 6K:
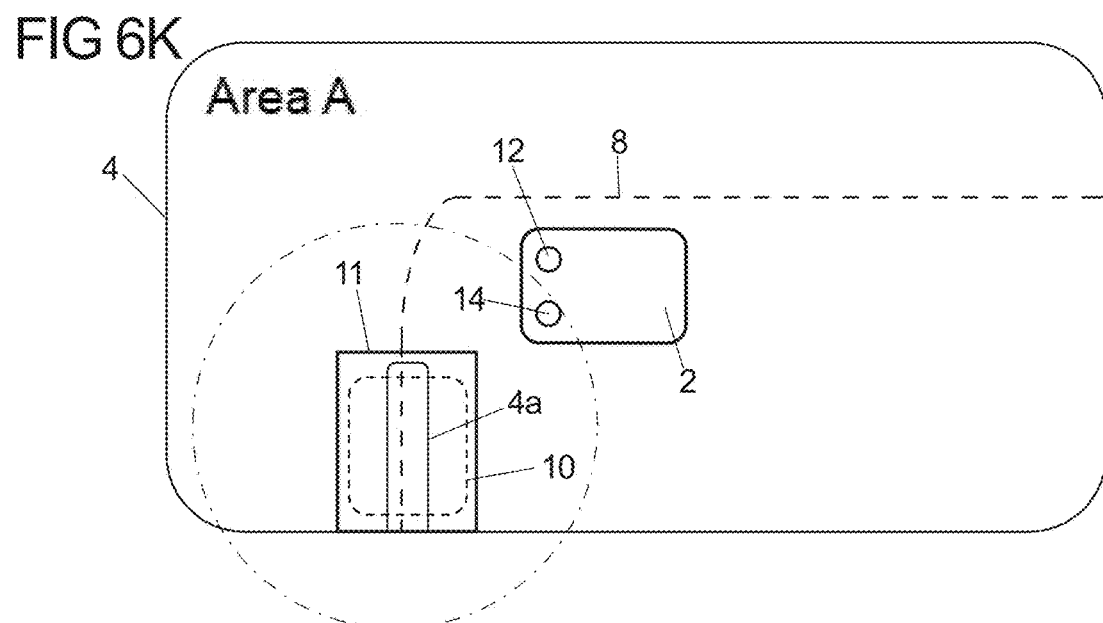
Figure 6L:
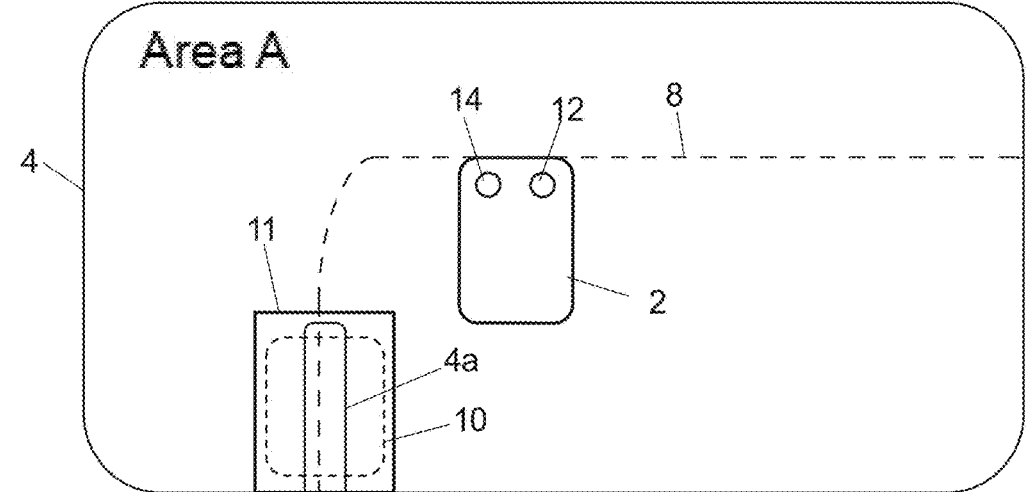
Figure 6M:
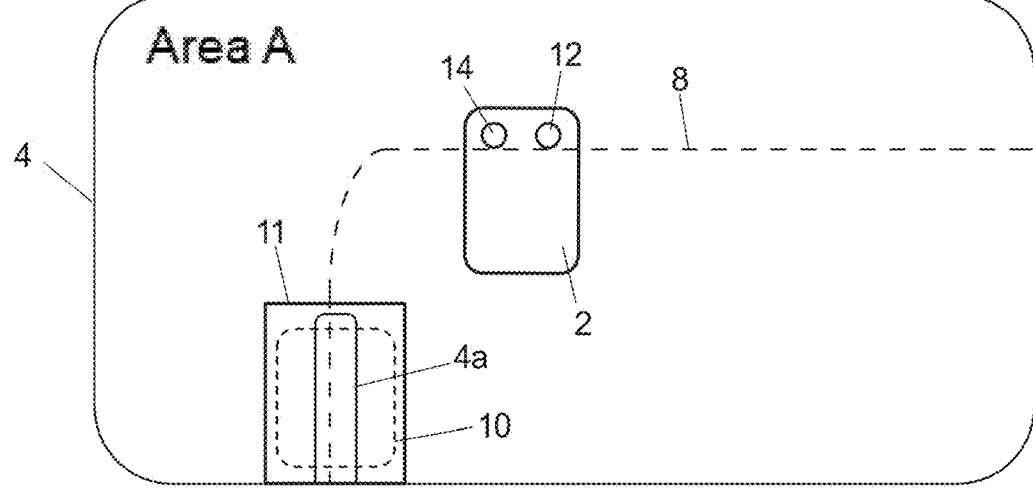
Figure 6N:
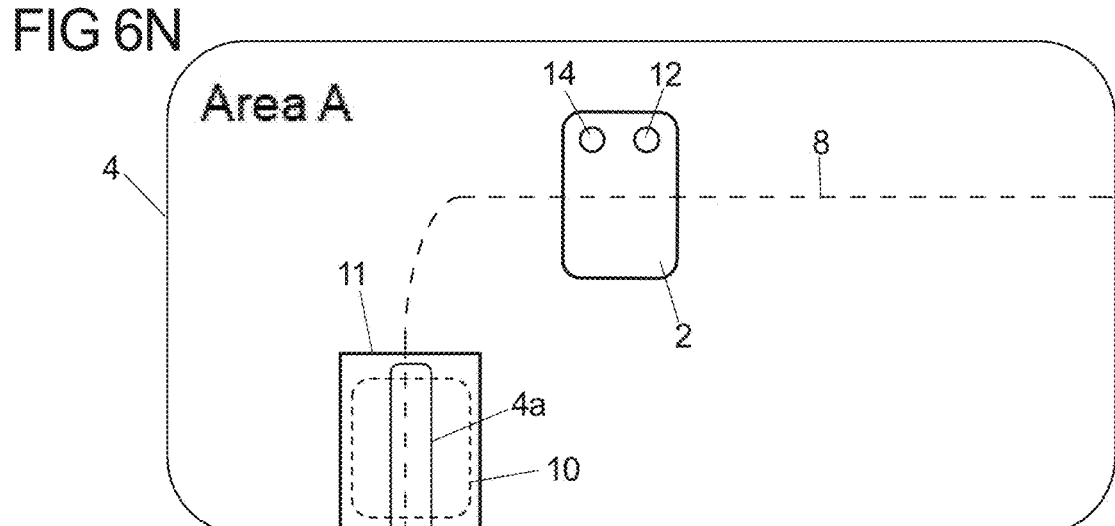
Figure 6O:
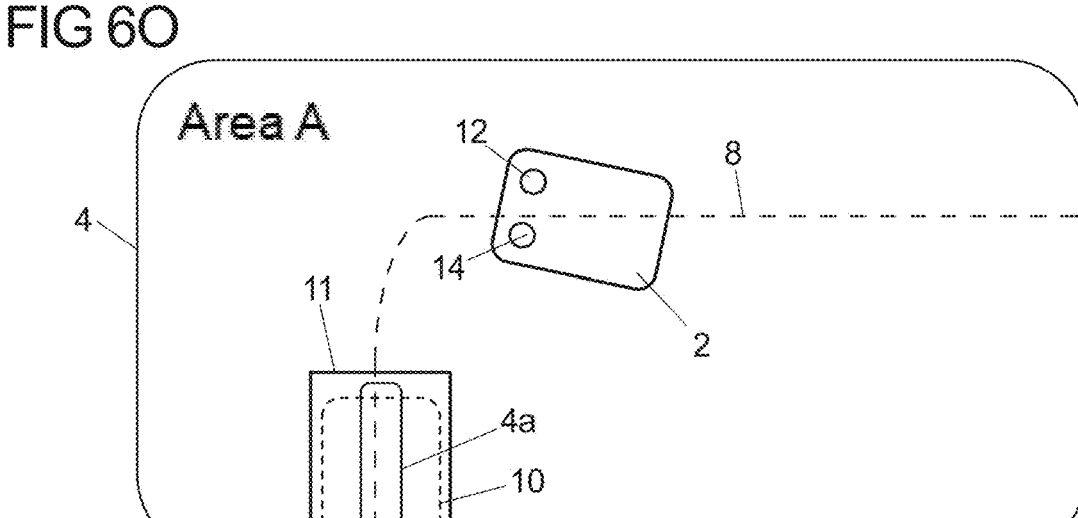
Figure 6P:
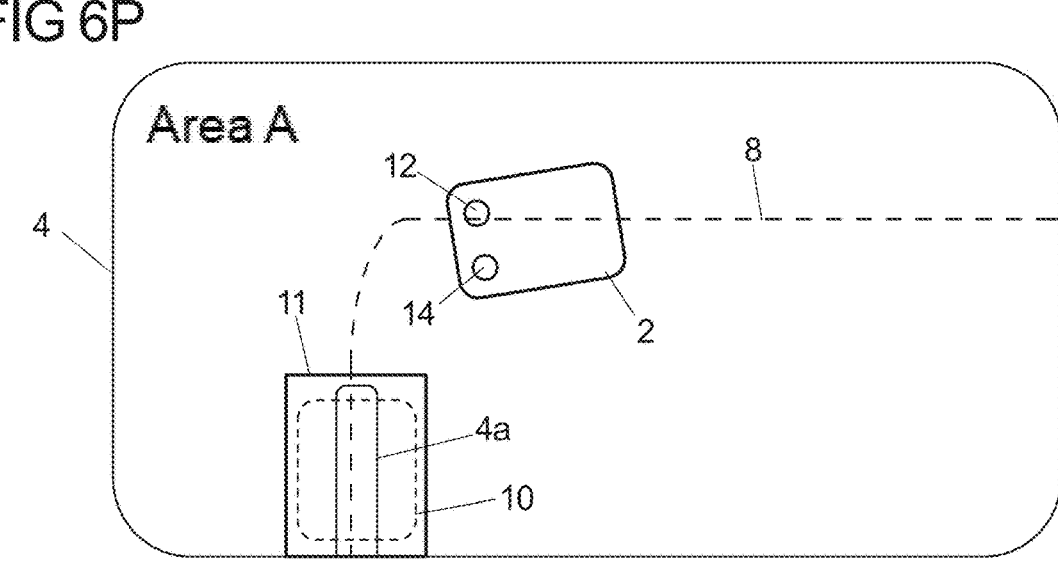
Figure 6Q:
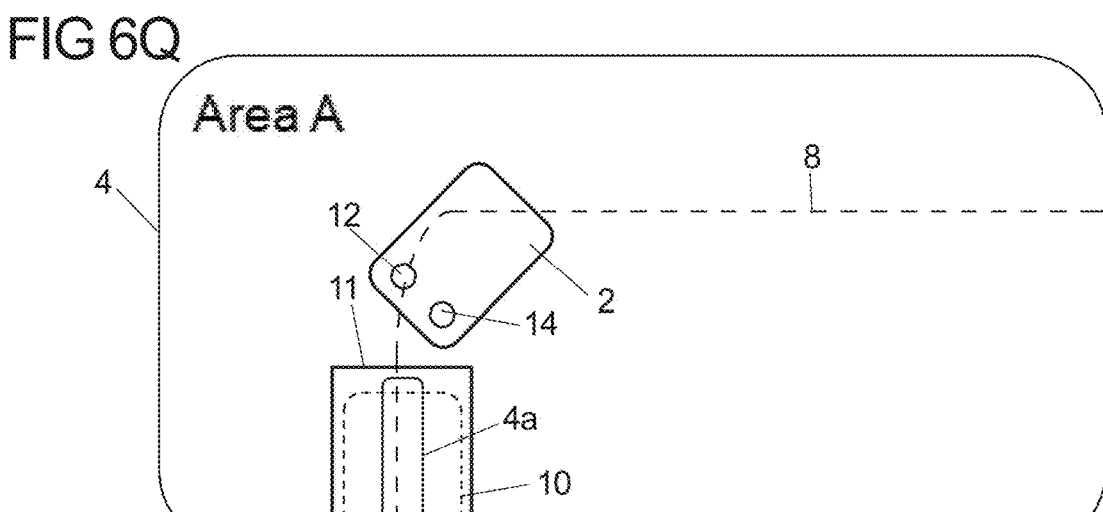
Figure 6R:
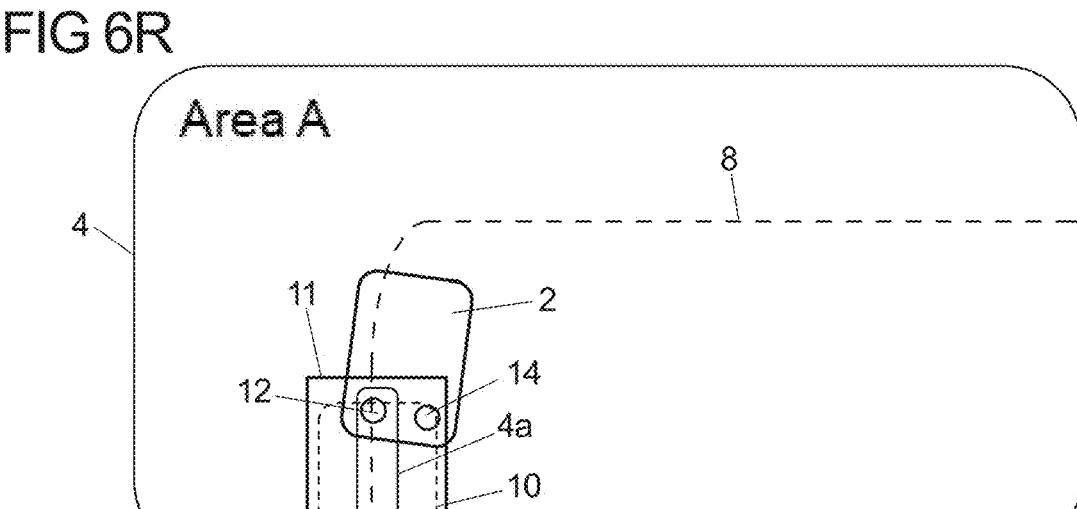
Figure 6S:
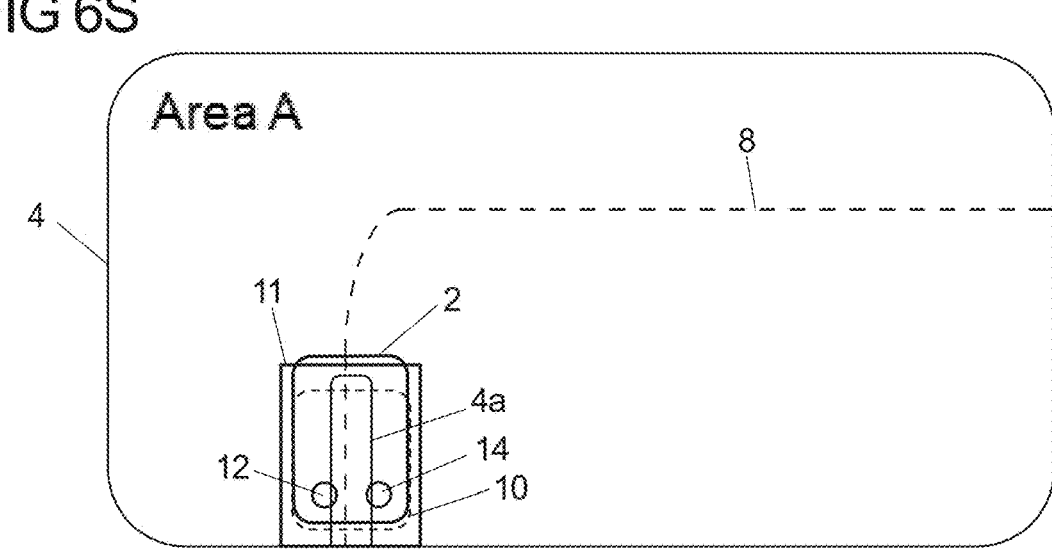

Turning now to FIG. 6A to FIG. 6S an exemplary embodiment will be closer described.

Firstly, a command is triggered, indicating that the robotic mower 2 shall navigate towards a predetermined position, in the present example the charging station 11. The command may be triggered by the signal generator 6, or by the control unit 22. The robotic mower 2 then starts to search for the guide wire 8. For finding the guide wire 8, the robotic mower 2 drives across the area A and the sensors 12, 14 are used to listen for guide wire 8 signals. The guide wire 8 signals have a range, e.g. of several meters, within which the sensors 12, 14 can sense the signals. As soon as one or both of the sensors 12, 14 receive the guide wire 8 signals, the robotic mower 2 is commanded to drive to the guide wire 8, e.g., simply by continuing to drive straight until the robotic mower 2 crosses the guide wire 8.

To create the guide wire 8 signals, the signal generator 6 directs current through the guide wire 8 which creates a magnetic field around the guide wire 8 having a polarity. Thus, on one side of the guide wire 8, the polarity of the guide wire 8 signal is opposite to the polarity at the other side of the guide wire 8. As soon as the robotic mower 2 crosses the guide wire 8, one or both of the sensors 12, 14 detect a change of the polarity. By detecting this change, the robotic mower 2, more precisely, its control unit 22, is configured to determine that it crosses the guide wire 8.

FIG. 6A shows a situation where the robotic mower 2 detects the guide wire 8. A first sensor 12 of the sensors 12,

14 has crossed the guide wire 8 while the other has not, so the robotic mower 2 can deduce that it is located directly above the guide wire 8.

In the present example, the robotic mower 2 arrived at the guide wire 8 at an angle, and in the situation shown in FIG. 6A, the first sensor 12 has crossed the guide wire 8 while the other, second sensor 14 of the sensors 12, 14 has not yet crossed it. By measuring the guide wire 8 signal polarity with the sensors 12, 14, the robotic mower 2 determines that it is directly above the guide wire 8. When the robotic mower 2 would arrive at the guide wide 8 orthogonally thereto, both sensors 12, 14 would detect a switch of the polarity at the same time, so the robotic mower 2 could deduce that it is directly above the guide wire 8 in that situation.

As shown in FIG. 6B, in response to detecting that it is located above the guide wire 8, the robotic mower 2 is adapted to drive further (in particular, straight ahead) across the guide wire 8 for a predefined distance. The predefined distance may be the length of the mower or a fraction thereof, or the turning radius of the robotic mower 2 or a fraction thereof. After driving the predefined distance, both sensors 12, 14 are arranged at the same side of the guide wire 8. Based on the guide wire 8 signal polarity, the robotic mower 2 determines the direction (along the guide wire 8) to the charging station 11. Next, the robotic mower 2 turns left or right in this determined direction of the charging station 11. While rotating relative to the guide wire 8, the robotic mower 2 analyzes the guide wire 8 signal polarity. As soon as one of the sensors 12, 14, in the figures, the left, second sensor 14, detects a change of the polarity, the robotic mower 2 determines that the guide wire 8 is substantially aligned with the robotic mower 2, in the present example, aligned with the forward-rearward axis of the robotic mower 2.

FIG. 6C shows the robotic mower 2 after aligning with the guide wire 8. The robotic mower 2 now faces the direction along the guide wire 8 towards the charging station 11.

Next, as shown in FIG. 6D, the robotic mower 2 starts to straddle the guide wire 8 with one of the sensors 12, 14 directly above the guide wire 8. In the present example, this is the right-hand side sensor 12. The other sensor 14 (here, as an example, the left-hand side sensor) is the one outside the guide loop, with in the figures is below the guide wire 8. While straddling along the guide wire 8, the robotic mower 2 searches for a straight section of the wire, in particular a straight section having a predefined length, or a length being a factor of a random corridor distance Rc (described in more detail below). The robotic mower 2 may be adapted to search for a straight section of the guide wire 8 having a length, wherein the length is different run by run (wherein one run corresponds to navigating to the predetermined position once), in particular based on a random value.

FIG. 6E shows the robotic mower 2 after straddling along the guide wire 8 until it found a straight section 8a of the guide wire 8 by driving along the straight section 8a and determining that it is straight due to the fact that it did not have to make turns to follow the guide wire 8. At the straight section 8a, the guide wire 8 is routed along a straight line. After detecting the straight section 8a, the robotic mower 2 stops.

After stopping (alternatively at a different point in time, e.g., before or while searching for a straight section of the guide wire 8, or in response to the command being triggered indicating that the robotic mower 2 shall navigate towards the predetermined position) the robotic mower 2 (more precisely, the control unit 22) determines the random corridor distance Rc to the guide wire 8 using a random number generator. The random corridor distance Rc may be used as a random distance value or the random distance value may be calculated based on the random corridor distance Rc. The random distance value is a measure for a length and is based on a random number. The robotic mower 2 also calculates a reversing distance based on the random distance value, e.g. by multiplying (or dividing) the random distance value by a factor, and/or using triangulation or more complex calculations.

FIG. 6F shows that, next, the robotic mower 2 reverses and drives in the opposite direction as before along the straight section 8a of the guide wire 8 for the reversing distance. The reversing distance is shorter than or equal to the length of the straight section 8a.

Next, the robotic mower 2 turns by an angle relative to the guide wire 8. In the example according to FIG. 6G, the robotic mower 2 turns towards the outside of the guide loop of the guide wire 8. In FIG. 6G, the robotic mower 2 turns left. Here, the robotic mower 2 turns by an angle of 45 degrees. It is not necessary to follow any signal in this regard.

With reference to FIG. 6H, after turning, the robotic mower 2 drives straight forward by a displacement distance. The displacement distance is calculated by the robotic mower 2 based on the random distance value, e.g. by multiplying (or dividing) the random distance value by another factor, and/or using triangulation or more complex calculations. After driving by the displacement distance at 45 degrees to the guide wire 8, the mower is displaced to the guide wire 8 by the corridor distance Rc to the guide wire 8. For example, the corridor distance Rc is the closest distance between the robotic mower 2 and the guide wire 8.

The robotic mower 2 may be adapted to search for a straight section of the guide wire 8 having a length, wherein the length is based on the random corridor distance Rc, and/or based on the same random number used to calculate the random corridor distance Rc.

As indicated by FIG. 6I, the robotic mower 2 then stops and turns back by the angle in the opposite direction (here, 45 degrees), so as to orient in parallel with the guide wire 8. It is worth noting that for displacing the mower relative to the guide wire 8, no signal level determination is necessary. Instead, odometry is used. For determining the driving distance, in particular the displacement distance, the robotic mower 2 may control its drive motor(s) to operate at a given speed and count the time of driving. Alternatively or in addition, the robotic mower may count a number of rotations of a rotatable component of the drive mechanism, e.g., of a wheel 20, to determine the driven distance.

After stopping or after turning to be parallel to the guide wire 8, the robotic mower 2 determines the signal level of the guide wire signals 8, e.g., it determines the signal amplitude (e.g., samples the signal level). The robotic mower 2 then follows the guide wire 8 at this signal level. When the signal level changes while driving, e.g. due to a curve of the guide wire 8, the robotic mower 2 adapts its driving direction accordingly. Thus, the robotic mower 2 follows the guide wire at a constant distance that directly depends on the initial random number.

FIG. 6J shows the robotic mower 2 after following the guide wire 8 for a certain way.

FIG. 6K shows the robotic mower 2 after entering a range of the charging station loop 10 signals. These signals indicate to the robotic mower 2 that it is close to the charging station 11. The robotic mower 2 detects the charging station loop 10 signals with one or both sensors 12, 14, or with another sensor.

In response to detecting the charging station loop 10 signals, the robotic mower 2 turns towards the guide wire 8. In the present example, the robotic mower 2 makes a turn by 90 degrees (in this example, to the right). In other words, the robotic mower 2 turns so as to drive the shortest way to the guide wire 8.

FIG. 6L shows the robotic mower 2 after turning towards the guide wire 8. After that, the robotic mower 2 drives straight forward towards the guide wire 8 until it detects the guide wire 8.

FIG. 6M shows the robotic mower 2 after driving straight forward until the sensors 12, 14 detect a change in polarity of the guide wire 8 signals. The robotic mower 2 then drives further straight forward by a predefined distance, see FIG. 6N.

The robotic mower 2 may again determine the direction towards the charging station 11 by analyzing the guide wire 8 signal polarity. The robotic mower 2 then turns towards the charging station 11 until the sensors 12, 14 detect opposite guide wire 8 signal polarities, see FIG. 6O.

The robotic mower then starts straddling along the guide wire 8 using one sensor 12 of the two sensors 12, 14, here the sensor at the side of the robotic mower 2 inside the guide wire loop, here the right-hand-side sensor 12, see FIG. 6P.

FIG. 6Q shows the robotic mower 2 after continuing to straddle along the guide wire 8 towards the charging station 11.

Next, the robotic mower 2 detects that one or both of the sensors 12, 14 has/have entered the charging station loop 10 (e.g., by a change of the measured charging station loop 10 signal polarity), see FIG. 6R.

In response to detecting entering of the charging station loop 10, the robotic mower 2 docks on the charging station using the boundary wire loop 4a inside the charging station plate 24. If the left sensor 14 is outside of the boundary wire loop 4a and the right sensor 12 is inside, the robotic mower 2 turns (slightly) left. If the left sensor 14 is inside of the boundary wire loop 4a and the right sensor 12 is outside, the robotic mower 2 turns (slightly) right. Otherwise the robotic mower 2 drives straight forward until the charging connectors 16, 26 come into operative connection, e.g., make electrical contact, see FIG. 6S. The guide wire 8 is routed with an offset from a center line of the charging station 11 for a precise guiding using one of the sensors 12, 14. After docking, the battery 18 of the robotic mower 2 is charged.

By using a random distance value, instead of, e.g., a random signal level value, a more precise and reliable setting of a random distance is possible. The random distance value may be defined with a millimeter precision. Also, the randomness can be improved by this. As a result, the formation of tracks when the robotic mower 2 returns to the charging station many times can be strongly suppressed.

Turning now to FIG. 7, an exemplary method will now be described. The method starts in step S100 in which the robotic mower 2 processes, e.g. receives, a return signal at or from the control unit 22, which commands the robotic mower 2 to return to the charging station 11. Step S100 may be triggered by detecting that the power in the battery 18 is lower than a predetermined limit. The predetermined limit is set such that the robotic mower 2 may safely return to the charging station 11 before the battery 18 is empty, even if it happens to be the longest possible way back to the charging station 11.

When the robotic mower 2 has processed the command to return to the charging station 11, it commences with mowing the area A until it detects the guide wire 8 by means of one or more of the robotic mower's 2 sensors 12, 14.

At step S101, the control unit 22 detects, using the at least one sensor, at least one signal from the wire, e.g., guide wire 8, in particular, a first guiding signal, wherein the guide wire 8 is a first guiding signal source. Thus, the control unit 22 determines that the wire or guide wire 8 is close.

Next, at step S102, the control unit 22 controls the robotic mower 2 to align itself with the wire, e.g., guide wire 8. For example, by aligning with the guide wire 8, the robotic mower 2 drives over the guide wire 8 and turns such that a longitudinal extension of the robotic mower 2 is oriented on the same axis as the section of the guide wire 8 below the robotic mower 2.

Optionally, aligning with the wire comprises the step S200 of crossing, by the robotic mower 2, the wire 8 by a predetermined crossing distance. Further, aligning may comprise the step S201 of determining a direction based on a polarity of the at least one signal of the guide wire 8, measured by means of the at least one sensor 12, 14. Further, aligning may comprise the step S202 of turning the robotic mower towards the determined direction. Further, turning the robotic mower 2 towards the determined direction may comprise rotating the robotic mower 2 with respect to the guide wire 8 until the two sensors 12, 14 detect the at least one signal of the guide wire 8 with opposite polarity.

The step S102 of aligning the robotic mower 2 with the guide wire 8 may comprise the step S203 of controlling the robotic mower 2 to follow the guide wire 8 in a first direction until detecting a straight-line section 8a of the wire 8 (e.g., having a predetermined length), and, in response to detecting the straight section 8a of the guide wire 8, may comprise the step S204 of controlling the robotic mower 2 to follow the guide wire 8 in a second direction opposite the first direction. For example, the first direction is the direction along the guide wire 8 towards the charging station 11, and the second direction is the direction along the guide wire 8 away from the charging station.

The method proceeds to step S103 (optional in embodiments) which comprises controlling the robotic mower 2 to turn by an angle with respect to the straight section 8a of the guide wire 8, e.g. by 45 degrees.

After turning by an angle, according to step S104 (optional in embodiments), the control unit 22 controls the robotic mower 2 to increase the distance between itself and the guide wire 8 by driving a displacement distance based on a random distance value, and along a straight line oriented at the angle the robotic mower turned in step S103.

Next, the method proceeds to step S105 (optional in embodiments), comprising measuring, by means of the at least one sensor, a signal level, e.g. an amplitude, of the at least one signal from the guide wire 8. Thus, after displacing itself by a certain distance, the control unit 22 samples the signal level.

Thereafter, in optional step S106, the control unit 22 controls the robotic mower 2 to follow the guide wire 8 in a fixed distance that is constant along the guide wire 8, e.g., based on the measured signal level, what is a simple and effective way to maintain the distance to the guide wire that has been randomly set before. The steps S100 through S106 are repeated each time when the robotic mower 2 returns to the charging station 11, or, more generally, when driving to a predetermined position.

According to an embodiment, a method for guiding a robotic mower 2 to a predetermined position, e.g., the charging station 11, is provided. The method proceeds from step S106 described above to step S107 as shown in FIG. 8. Optionally, steps S102 through S105 are omitted, alternatively these steps are performed as well.

At step S107, the robotic mower 2 detects, by means of the at least one sensor 12, 14, a second signal from a second signal source 10 within a predetermined distance from the predetermined position. The second signal source is, e.g., the charging station loop 10.

Next, at step S108, the robotic mower 2 is controlled to follow the first guiding signal at a pre-configured distance from the first guiding signal source, in particular the guide wire 8.

The method then proceeds to step S109, wherein the robotic mower 2 detects, by means of the at least one sensor 12, 14, a third signal from a third signal source, e.g. the loop 4a of the boundary wire 4.

Finally, at step S110, the robotic mower 2 is controlled to follow the third signal to dock the robotic mower at the charging station 11 at the predetermined position, e.g., by electrically contacting charging connectors of the charging station 11. It is worth noting that the robotic mower 2 may be guided to the predetermined position more than once. Specifically, the robotic mower 2 may be adapted such that the fixed distance is varied each time the robotic mower 2 is guided to the predetermined position, while the pre-configured distance each time is the same.

Although, the present invention has been described above with reference to specific embodiments, it is not intended to be limited to the specific form set forth herein. Rather, the invention is limited only by the accompanying claims.

In the claims, the term "comprises/comprising" does not exclude the presence of other elements or steps. Furthermore, although individually listed, a plurality of means or elements may be implemented by e.g. a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second" etc. do not preclude a plurality. Reference signs in the claims are provided merely as a clarifying example and shall not be construed as limiting the scope of the claims in any way.

LIST OF REFERENCE NUMERALS

2 robotic mower
4 boundary wire
4a boundary wire loop
6 signal generator
8 guide wire
8a straight section
10 charging station loop
11 charging station
12 sensor
14 sensor
16 charging connector
18 battery
20 wheel
22 control unit
24 charging station plate
26 charging connector
60 processor
62 memory
64 computer program
80 processor

82 memory
84 computer program
A area

What is claimed is:

1. A method for navigating a robotic mower by means of a guide wire, said robotic mower comprising at least one sensor, the method comprising:

detecting, by means of the at least one sensor, at least one signal from the guide wire, controlling the robotic mower to align with the guide wire, controlling the robotic mower to follow the guide wire in a first direction until detecting a straight section of the guide wire, controlling the robotic mower to follow the guide wire in a second direction opposite the first direction in response to detecting the straight section of the guide wire, driving a reversing distance based on a random distance value when following the guide wire in the second direction, controlling the robotic mower to turn by an angle with respect to a section of the guide wire, controlling the robotic mower to increase the distance between the robotic mower and the guide wire by driving a displacement distance based on the random distance value, measuring, by means of the at least one sensor, a signal level of the at least one signal from the guide wire, and controlling the robotic mower to follow the guide wire based on the measured signal level;

wherein the random distance value is multiplied by a first factor for calculating the reversing distance, and the random distance value is multiplied by a second factor for calculating the displacement distance.

2. The method according to claim 1, wherein controlling the robotic mower to drive the displacement distance based on the random distance value comprises counting a number of revolutions of a rotatable component of the robotic mower and/or measuring a time.

3. The method according to claim 2, wherein controlling the robotic mower to align with the guide wire comprises crossing, by the robotic mower, the guide wire by a predetermined crossing distance, determining a direction based on a polarity of the at least one signal of the guide wire, measured by means of the at least one sensor, and turning the robotic mower towards the determined direction.

4. The method according to claim 3, wherein the robotic mower comprises at least two sensors, and turning the robotic mower towards the determined direction comprises rotating the robotic mower with respect to the guide wire until the at least two sensors detect the at least one signal of the guide wire with opposite polarity.

5. The method according to claim 1, wherein controlling the robotic mower to turn by the angle with respect to the section of the guide wire comprises turning the robotic mower with respect to the section of the guide wire by 30 to 60 degrees, in particular by 45 degrees.

6. The method according to claim 5, further adapted for guiding the robotic mower to a predetermined position, wherein the at least one signal from the guide wire is a first guiding signal and the guide wire is a first guiding signal source, the method further comprising:

controlling the robotic mower to follow the first guiding signal at a fixed distance to the first guiding signal source, detecting, by means of the at least one sensor, a second signal from a second signal source within a predetermined distance from the predetermined position, controlling the robotic mower to follow the first guiding signal at a pre-configured distance from the first guiding signal source, detecting, by means of the at least one sensor, a third signal from a third signal source, and controlling the robotic mower to follow the third signal to dock the robotic mower at the predetermined position.

7. A method for guiding a robotic mower to a predetermined position, said robotic mower comprising at least one sensor, the method comprising:

detecting, by means of the at least one sensor, a first guiding signal from a first guiding signal source, the first guiding signal source being a guide wire arranged within an area delimited by a boundary wire, controlling the robotic mower to align with the guide wire, controlling the robotic mower to follow the guide wire in a first direction until detecting a straight section of the guide wire, in response to detecting a straight section of the guide wire, controlling the robotic mower to follow the guide wire in a second direction opposite the first direction to drive a reversing distance based on a random distance value;

controlling the robotic mower to turn by an angle with respect to a section of the guide wire;

controlling the robotic mower to increase the distance between the robotic mower and the guide wire by driving a displacement distance based on the random distance value, measuring, by means of the at least one sensor, a signal level of the at least one signal from the guide wire, controlling the robotic mower to follow the guide wire based on the measured signal level to controlling the robotic mower to follow the first guiding signal at a fixed distance to the first guiding signal source, detecting, by means of the at least one sensor, a second signal from a second signal source within a predetermined distance from the predetermined position, controlling the robotic mower to follow the first guiding signal at a pre-configured distance from the first guiding signal source, detecting, by means of the at least one sensor, a third signal from a third signal source, and controlling the robotic mower to follow the third signal to dock the robotic mower at the predetermined position;

wherein the random distance value is multiplied by a first factor for calculating the reversing distance, and the random distance value is multiplied by a second factor for calculating the displacement distance.

8. The method according to claim 7, wherein the third signal source is a portion of, or electrically connected with, the boundary wire delimiting an area.

9. The method according to claim 7, wherein a charging station is provided at the predetermined position, and a boundary wire loop is arranged at a charging station plate of the charging station.

10. The method according to claim 9, wherein the robotic mower is guided to the predetermined position more than once, wherein the fixed distance is varied each time, while the pre-configured distance each time is the same.

11. A robotic mower comprising at least one sensor, and adapted to:

detect, by means of the at least one sensor, at least one signal from a guide wire, align with the guide wire;

follow the guide wire in a first direction until detecting a straight section of the guide wire, and follow the guide wire in a second direction opposite the first direction in response to detecting the straight section of the guide wire;

drive a reversing distance based on a random distance value when follow the guide wire in a second direction;

turn by an angle with respect to a section of the guide wire, increase the distance to the guide wire by driving a displacement distance based on a random distance value, measure, by means of the at least one sensor, a signal level of the at least one signal from the guide wire, follow the guide wire based on the measured signal level; and wherein the random distance value is multiplied by a first factor for calculating the reversing distance, and the random distance value is multiplied by a second factor for calculating the displacement distance.

12. The robotic mower according to claim 11, further adapted to count a number of revolutions of a rotatable component of the robotic mower and/or to measure a time for driving the displacement distance based on the random distance value.

13. The robotic mower according to claim 12, further adapted to cross the guide wire by a predetermined crossing distance, to determine a direction based on a polarity of the at least one signal of the guide wire measured by means of the at least one sensor, and to turn towards the determined direction.

14. The robotic mower according to claim 13, comprising at least two sensors, and being further adapted to turn towards the determined direction by rotating with respect to the guide wire until the at least two sensors detect the at least one signal of the guide wire with opposite polarity, the robotic mower further adapted to follow the guide wire in a first direction until detecting a straight section of the guide wire, and, in response to detecting a straight section of the guide wire, to follow the guide wire in a second direction opposite the first direction.

15. The robotic mower according to claim 14, further adapted to follow the guide wire in the second direction by driving a reversing distance based on the random distance value.

16. The method according to claim 1, wherein the random distance value is a measure for a length and is calculated based on a random number by using a random number generator.

17. The method according to claim 6, said the robotic mower comprising at least two sensors on the robotic mower, wherein a charging station loop is arranged around the charging station, a boundary wire loop narrower than charging station loop crosses the charging station loop, a distance between the two sensors is narrower than a width of the charging station loop and is greater than a width of the boundary wire loop, the charging station loop corresponds to the second signal source, and the boundary wire loop corresponds to the third signal source, and the method further comprises adjusting a position of the mower to adapt each of the two sensors to be located out of the boundary wire loop and inside the charging station loop so as to dock the robotic mower at the predetermined position.

\* \* \* \* \*